United States Patent
Kodama

(10) Patent No.: US 11,843,595 B2
(45) Date of Patent: Dec. 12, 2023

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Junichi Kodama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 268 days.

(21) Appl. No.: 17/156,020

(22) Filed: Jan. 22, 2021

(65) Prior Publication Data
US 2021/0243182 A1    Aug. 5, 2021

(30) Foreign Application Priority Data
Jan. 30, 2020    (JP) ................. 2020-014217

(51) Int. Cl.
*H04L 9/40* (2022.01)
*H04L 9/32* (2006.01)

(52) U.S. Cl.
CPC ........ *H04L 63/0838* (2013.01); *H04L 9/3228* (2013.01); *H04L 63/0846* (2013.01); *H04L 63/10* (2013.01)

(58) Field of Classification Search
CPC ............... H04L 63/0838; H04L 9/3228; H04L 63/0846; H04L 63/10; H04L 9/40; H04L 9/32
See application file for complete search history.

(56) References Cited

U.S. PATENT DOCUMENTS

| | | | | |
|---|---|---|---|---|
| 2013/0318348 | A1* | 11/2013 | Lebron | H04L 63/0428 713/168 |
| 2013/0332544 | A1* | 12/2013 | Brian | H04L 51/48 709/206 |
| 2015/0237049 | A1* | 8/2015 | Grajek | H04L 67/02 726/7 |
| 2019/0288998 | A1* | 9/2019 | Johansson | H04L 63/0281 |
| 2020/0364525 | A1* | 11/2020 | Mats | H04W 4/70 |

FOREIGN PATENT DOCUMENTS

| | | |
|---|---|---|
| JP | 2004-192193 A | 7/2004 |
| TW | 201438451 A * | 10/2014 |

* cited by examiner

*Primary Examiner* — Jayesh M Jhaveri
(74) *Attorney, Agent, or Firm* — Canon U.S.A., Inc. IP Division

(57) ABSTRACT

An information processing apparatus configured to manage information regarding a user includes a reception unit configured to receive an execution request for executing first processing involving authentication of the user from a server configured to provide a service to the user, a verification unit configured to verify whether the execution request is valid, a message transmission unit configured to transmit, to a terminal operated by the user, a message including a link for accessing the server on a basis of a result of verification. The message is a message to provide the terminal with a screen that allows the server to execute second processing depending on a result of the first processing.

15 Claims, 12 Drawing Sheets

FIG. 4A

| USER ID _401 | PASSWORD _402 | E-MAIL ADDRESS _403 |
|---|---|---|
| User001 | aaa | user001@example.com |
| User002 | bbb | user002@example.com |
| ... | ... | ... |

FIG. 4B

| CLIENT ID _404 | CLIENT SECRET _405 | CLIENT URL _406 | PROCESSING SCOPE _407 |
|---|---|---|---|
| Client001 | aaa | https://client001.com/app | UserActivate, UserUpdate |
| Client002 | bbb | https://client002.com/app | — |
| ... | ... | ... | ... |

FIG. 4C

| CONFIRMATION CODE ID _409 | USER ID _410 | CLIENT ID _411 | CLIENT URL _412 | PROCESSING SCOPE _413 | EXPIRATION DATE _414 |
|---|---|---|---|---|---|
| Code001 | User001 | Client001 | https://client001.com/app | UserUpdate | 20190101 |
| Code002 | User002 | Client002 | https://client002.com/app | UserActivate | 20190102 |
| ... | ... | ... | ... | ... | ... |

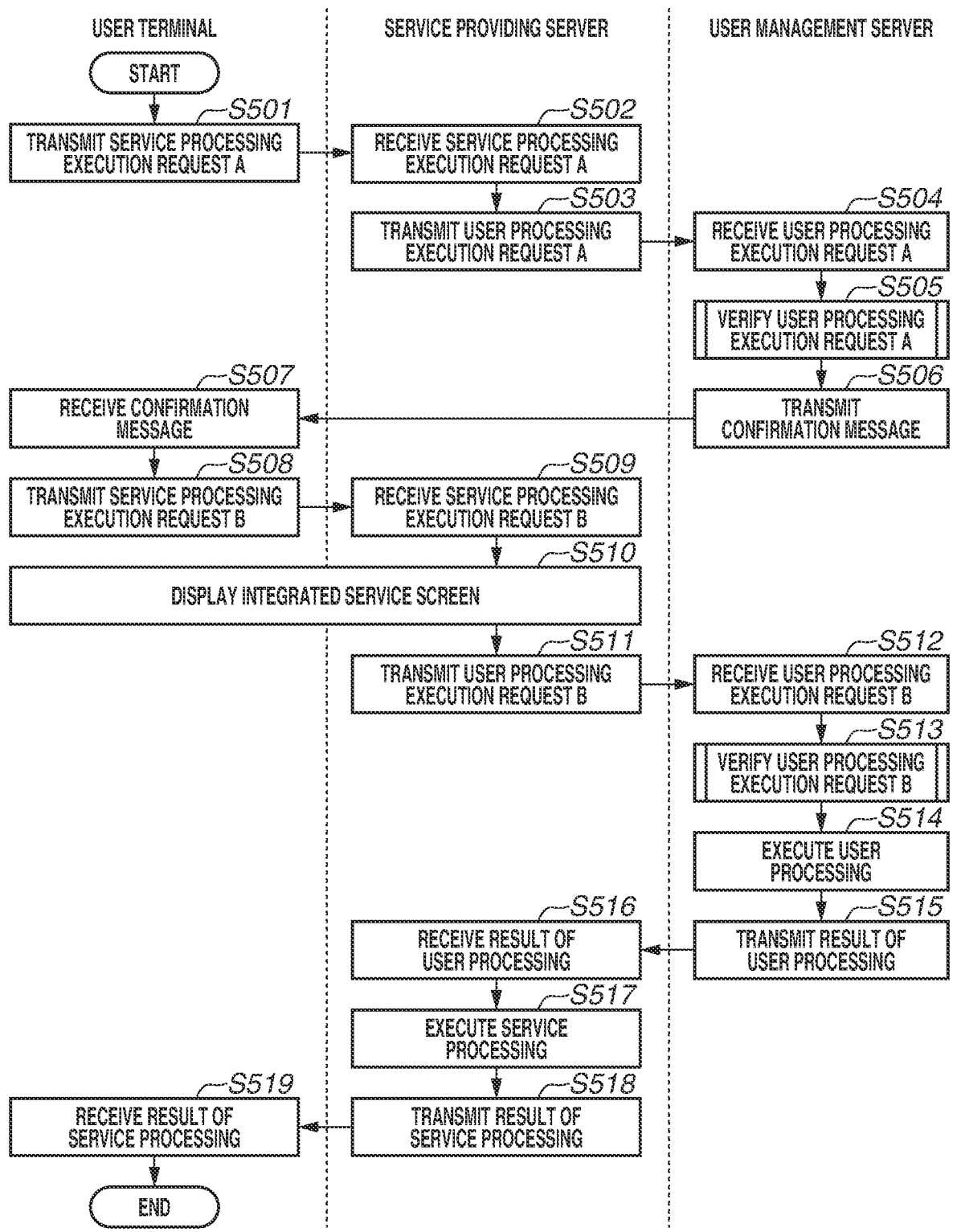

FIG.7

SUBJECT: NOTIFICATION OF USER REGISTRATION

BODY:
THE FOLLOWING USER HAS BEEN REGISTERED
· USER ID: AAA0001

PLEASE ACCESS THE URL BELOW FOR ACTIVATION.

https://client001.com/app/activate?code=12345
701

INFORMATION PROCESSING APPARATUS, INFORMATION PROCESSING METHOD, AND STORAGE MEDIUM

BACKGROUND

Field of the Disclosure

The present disclosure relates to a technique for authenticating a user who uses a service.

Description of the Related Art

In recent years, a service that allows a user to use various functions of a server via a network has been widely provided. The server typically provides the service to an authenticated user in a state where the user has logged in to the server. Japanese Patent Application Laid-Open No. 2004-192193 discusses a method in which an authentication server performs personal identification of a user by transmitting a confirmation e-mail including a one-time uniform resource locator (URL) to the user and permits a log-in of the user.

The technique of Japanese Patent Application Laid-Open No. 2004-192193 separately provides a screen corresponding to processing executed by a server that provides a service and a screen corresponding to processing executed by a server that manages registration, updating, and the like of users. This raises an issue that the user needs to take the trouble of checking screens before the user starts to use the service.

SUMMARY

Embodiments of the present disclosure have been made in view of solving the above issue, and are directed to providing processing to save the trouble of checking the screens when the user uses a service via authentication by a server.

According to embodiments of the present disclosure, an information processing apparatus configured to manage information regarding a user includes a reception unit configured to receive an execution request for executing first processing involving authentication of the user from a server configured to provide a service to the user, a verification unit configured to verify whether the execution request is valid, a message transmission unit configured to transmit, to a terminal operated by the user, a message including a link for accessing the server on a basis of a result of verification. The message is a message to provide the terminal with a screen that allows the server to execute second processing depending on a result of the first processing.

Further features of the present disclosure will become apparent from the following description of exemplary embodiments with reference to the attached drawings.

BRIEF DESCRIPTION OF THE DRAWINGS

FIGS. 4A to 4C are diagrams each illustrating an example of information stored in a storage unit.

FIG. 5 is a flowchart illustrating processing performed by the information processing system.

FIG. 7 is a diagram illustrating an example of a confirmation message.

DESCRIPTION OF THE EMBODIMENTS

Figure 1:
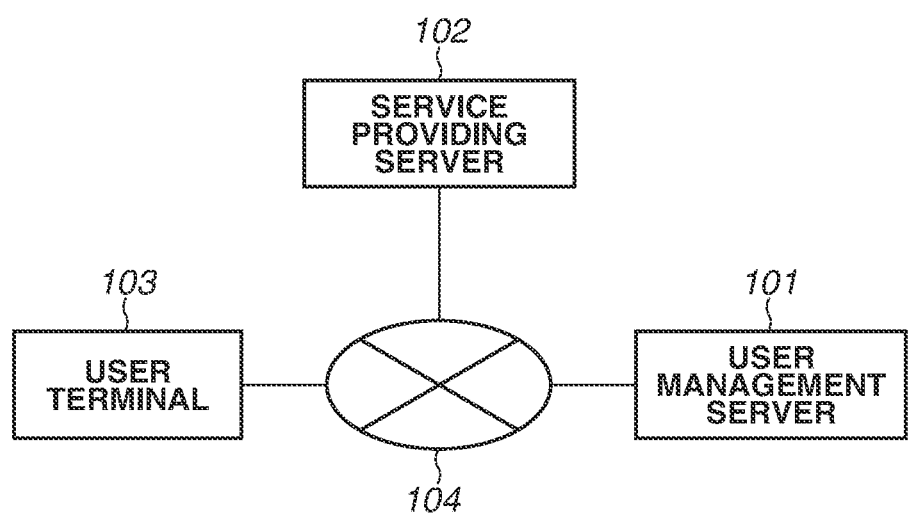
FIG. 1 is a block diagram illustrating a system configuration example of an information processing system.

Exemplary embodiments will be described below with reference to the accompanying drawings. The following exemplary embodiments do not necessarily limit the present disclosure. Not all combinations of features described in the exemplary embodiments are necessarily essential to a solution of the present disclosure.

In a system including a plurality of service providing servers, a user management server collectively manages users in many cases. The user management server has a function of executing various kinds of user processing such as registration, updating, and deletion of users, and a function of authenticating registered users. The service providing server allows a user authenticated by the user management server to log in to the service providing server and provides a service to each user.

In using a service involving user authentication, there may be a case where it is desired to execute service processing by the service providing server depending on a result of user processing by the user management server. One example is a case where the service providing server provides a screen corresponding to first use when the user management server executes initial activation processing. Another example is a case where the service providing server executes processing of updating an extended attribute when the user management server executes processing of updating a user attribute. For example, in a case where the service providing server provides an image management service, the service providing server updates information about a model of a camera as the updating of the extended attribute. In addition, in a case where the service providing server provides a print service, the service providing server updates information about a model of a printer as the updating of the extended attribute.

In this regard, in a first exemplary embodiment, the user management server, which has received a user processing execution request from the service providing server, determines whether the service providing server is an authorized client. If the service providing server is the authorized client, the user management server transmits a confirmation message including a link with the service providing server to a user terminal. In response to the user's access to the link with the service providing server, the service providing server provides a screen that allows the user to input information necessary for user processing and information necessary for service processing. The input from the user via the screen enables execution of the service processing depending on a result of the user processing. In addition, since a screen provided by the user management server and a screen provided by the service providing server are integrated, the user's trouble of checking screens is saved in comparison with a case where the user processing and the service processing are executed independently of each other. A detailed description will be given below of an information processing system including the user management server, the service providing server, and the user terminal according to the present exemplary embodiment.

<System Configuration of Information Processing System>

First, a description will be given of a system configuration example of the information processing system according to the present exemplary embodiment with reference to a block diagram illustrated in FIG. 1. The information processing system includes a user management server 101, a service providing server 102, and a user terminal 103. The user management server 101, the service providing server 102, and the user terminal 103 can communicate with one another via a network 104. The network 104 connects the components as an external network such as the Internet. The network 104 may connect the components as a single network such as a local area network (LAN), or may connect the components as a combination of the Internet, the LAN, and the like.

The user management server 101 is an information processing apparatus that manages and authenticates a user, and executes user processing involving personal identification by a confirmation message. The service providing server 102 is an information processing apparatus that provides a service to the user, and executes service processing in response to the user's request. The user terminal 103 is a terminal operated by the user to use the service provided by the service providing server 102. Examples of the user terminal 103 include a personal computer (PC) and a mobile terminal. To simplify the description, there are one user management server 101, one service providing server 102, and one user terminal 103 in the present exemplary embodiment. However, there may be a plurality of user management servers 101, a plurality of service providing servers 102, and a plurality of user terminals 103.

<Hardware Configuration of Information Processing Apparatus>

Figure 2:
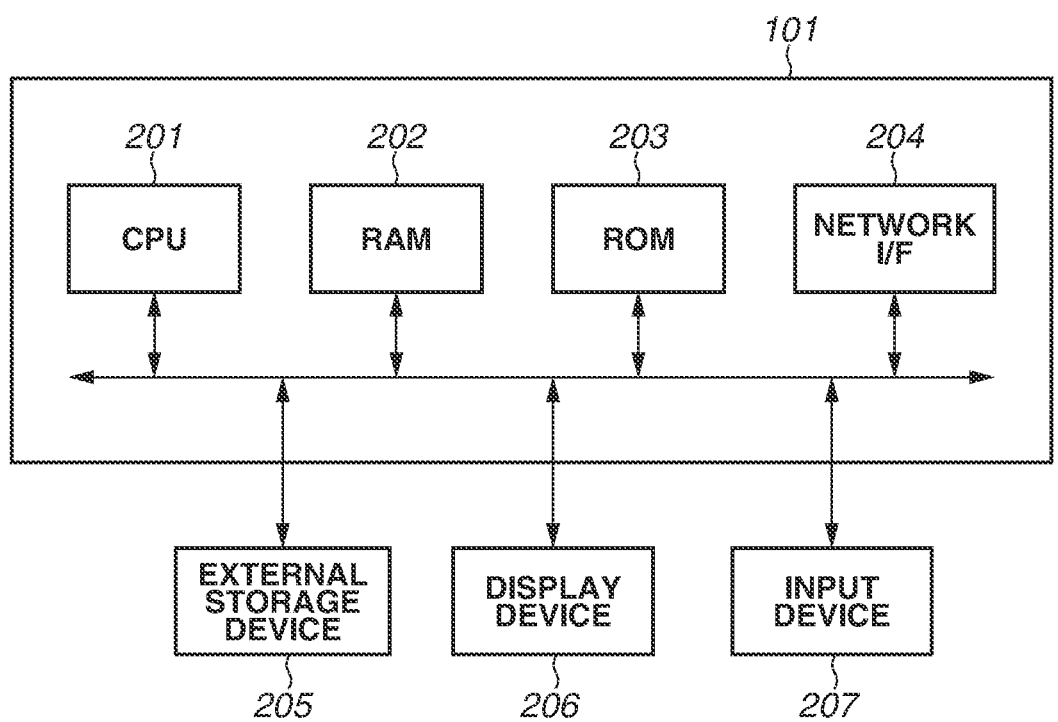
FIG. 2 is a block diagram illustrating a hardware configuration example of an information processing apparatus.

Subsequently, a description will be given of a hardware configuration example of the information processing apparatus constituting the information processing system according to the present exemplary embodiment. FIG. 2 is a block diagram illustrating a hardware configuration example of the user management server 101.

The user management server 101 includes a central processing unit (CPU) 201, a random-access memory (RAM) 202, a read-only memory (ROM), and a network interface (I/F) 204. The CPU 201 controls operations of each unit constituting the user management server 101, and also executes various kinds of processing described below as being executed by the user management server 101. The RAM 202 is a memory that temporarily stores data and control information, and serves as a work area used by the CPU 201 to execute various kinds of processing. Fixed operating parameters and an operating program of the user management server 101 are stored in the ROM 203. The network interface 204 is an interface that provides a function of connecting to and communicating with the network 104. The user management server 101 can transmit and receive data to and from an external apparatus via the network interface 204. An external storage device 205 connected with the user management server 101 is a device that stores data, and includes an interface to accept an input/output (I/O) command to read and write data. The external storage device 205 stores a computer program and data to cause the CPU 201 to execute each processing described below as being executed by the user management server 101. The external storage device 205 according to the present exemplary embodiment is a hard disk drive (HDD), but may be a storage device of another type such as a solid state drive (SSD), an optical disk drive, or a semiconductor storage device. A display device 206 connected with the user management server 101 is a display device that displays necessary information to a user. The display device 206 according to the present exemplary embodiment is a liquid crystal display (LCD), but may be a display device of another type such as a cathode-ray tube (CRT) display. Examples of an input device 207 are a keyboard and a mouse, and accepts a necessary input from the user. A touch panel display in which the display device 206 and the input device 207 are integrated may be used.

The service providing server 102 and the user terminal 103 each have a hardware configuration similar to that of the user management server 101. However, the user terminal 103 includes a display unit instead of being connected with the display device 206.

<Functional Configuration of Information Processing System>

Figure 3:
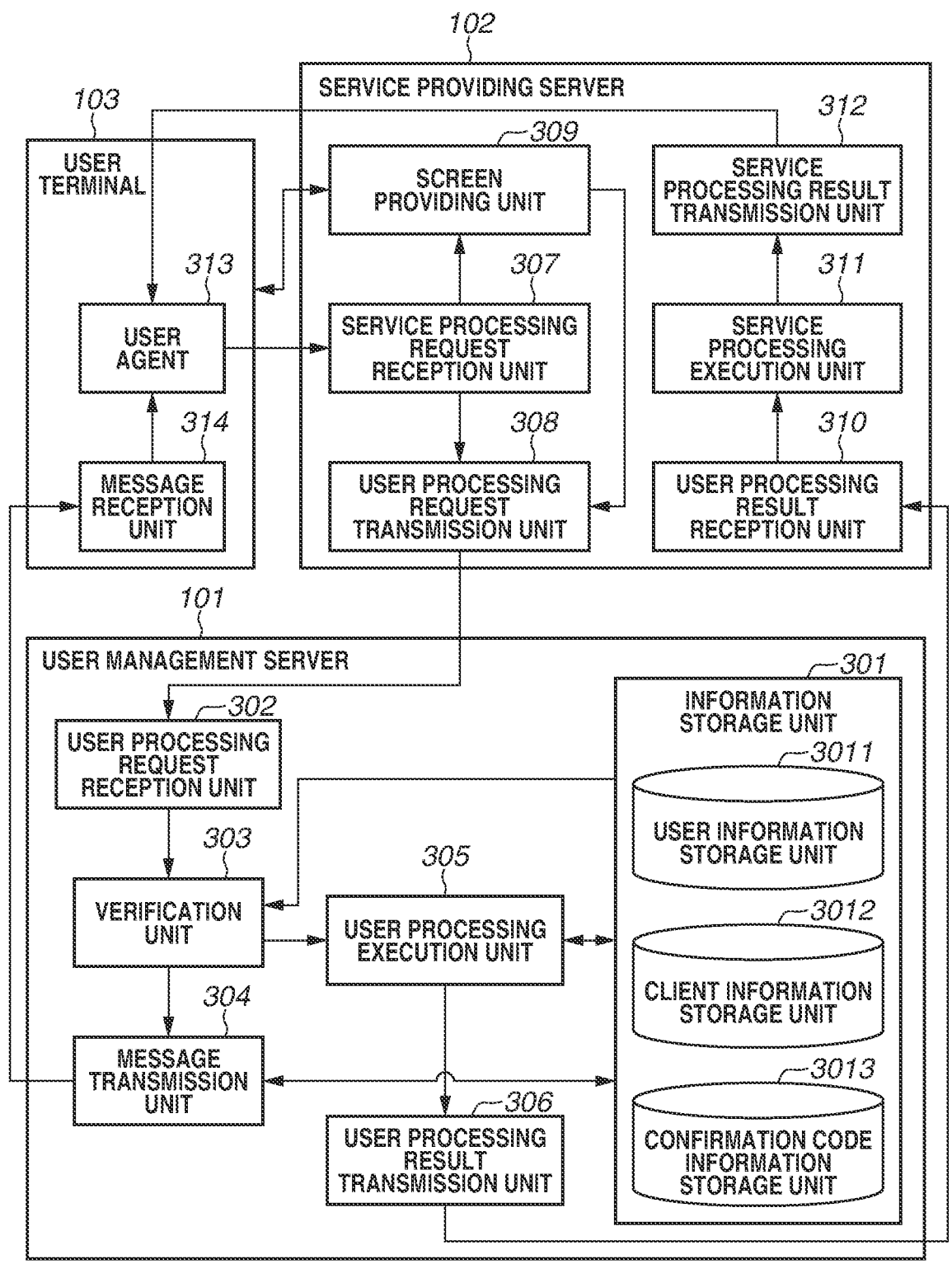
FIG. 3 is a block diagram illustrating a functional configuration example of the information processing system.

Subsequently, a functional configuration example of the information processing system according to the present exemplary embodiment will be described with reference to a block diagram of FIG. 3.

The user management server 101 includes an information storage unit 301, a user processing request reception unit 302, a verification unit 303, a message transmission unit 304, a user processing execution unit 305, and a user processing result transmission unit 306. The information storage unit 301 includes a user information storage unit 3011, a client information storage unit 3012, and a confirmation code information storage unit 3013. The user information storage unit 3011 stores user information. FIG. 4A illustrates an example of user information stored in the user information storage unit 3011. User attributes such as a password 402 and an e-mail address 403 are stored in association with user identification (ID) 401. The user ID 401 is ID for uniquely identifying a user. The password 402 is a character string for authenticating the user. While the password is used herein as information for authenticating the user, authentication information of another type such as information regarding biometric authentication may be used. The e-mail address 403 is an e-mail address used to notify the user of a confirmation message. While an e-mail is used herein as a means of notifying the user of the confirmation message, another notification means may be used.

The user management server 101 manages the service providing server 102 as a client. Information regarding the service providing server 102 is stored as client information in the client information storage unit 3012. FIG. 4B illustrates an example of client information stored in the client information storage unit 3012. A client secret 405, a client uniform resource locator (URL) 406, and a processing scope 407 are stored in association with client ID 404. The client ID 404 is ID for uniquely identifying the service providing server 102 as a client of the user management server 101. The client secret 405 is a character string for authenticating the client. While the secret is used herein as information for authenticating the client, authentication information of another type may be used. The client URL 406 represents a URL used when the user accesses the client. In other words, the client URL 406 is a URL used by the user terminal 103 to transmit a service processing execution request to the service providing server 102. The processing scope 407 represents a scope of user processing that the client is permitted to perform with respect to the user management server 101. The confirmation code information storage unit 3013 will be described below.

The user processing request reception unit 302 receives a user processing execution request from the service providing server 102. The verification unit 303 determines whether the user processing execution request is valid. Specifically, the verification unit 303 verifies the service providing server 102, which is a requestor of the user processing, with the use of client information stored in the client information storage unit 3012. In a case where the user processing execution request is valid, the message transmission unit 304 transmits a confirmation message to the user terminal 103 to execute the user processing involving personal identification (user authentication). At this time, the message transmission unit 304 includes a link with the client URL 406 of the verified service providing server 102 in the confirmation message as an access destination of the user processing. This allows execution of the user processing and the service processing through input of information to a screen displayed on the user terminal 103 in response to the user's access to the link in the confirmation message. In addition, the message transmission unit 304 issues a confirmation code and includes the confirmation code in the confirmation message. The confirmation code is a one-time password that can be used only once for the requested user processing. The issued confirmation code is stored in the confirmation code information storage unit 3013. The e-mail address 403 acquired from the user information storage unit 3011 is used as a transmission destination of the confirmation message.

FIG. 4C illustrates an example of confirmation code information stored in the confirmation code information storage unit 3013. User ID 410, client ID 411, a client URL 412, a processing scope 413, and an expiration date 414 are stored in association with confirmation code ID 409. The confirmation code ID 409 is ID for uniquely identifying the confirmation code. The user ID 410 represents a user who is a target of the user processing. The client ID 411 represents the service providing server 102 that executes the service processing. The client URL 412 is a URL of the service providing server 102 to be an access destination of the service processing. The processing scope 413 represents a content of the user processing in a scope of application of the confirmation code. The expiration date 414 is an expiration date of the confirmation code. The confirmation code that exceeds the expiration date is invalid.

In a case where the verification unit 303 determines that the confirmation code is valid, the user processing execution unit 305 executes the user processing. Specifically, the verification unit 303 verifies the confirmation code added to the user processing execution request using the confirmation code information stored in the confirmation code information storage unit 3013. If it is determined that the confirmation code is valid as a result of the verification, the user processing execution unit 305 interprets that user authentication necessary for the user processing has been performed and executes the user processing.

The service providing server 102 includes a service processing request reception unit 307, a user processing request transmission unit 308, a screen providing unit 309, a user processing result reception unit 310, a service processing execution unit 311, and a service processing result transmission unit 312. The service processing request reception unit 307 receives a service processing execution request from the user terminal 103. The user processing request transmission unit 308 transmits a user processing execution request to the user management server 101. The screen providing unit 309 displays, on the user terminal 103, a screen (hereinafter referred to as an integrated service screen) that allows a user to input information necessary for the user processing and information necessary for the service processing, and accepts input information (parameters). The user processing result reception unit 310 receives a result of the user processing executed by the user management server 101. The service processing execution unit 311 executes the service processing. The service processing result transmission unit 312 transmits a result of the service processing executed by the service providing server 102.

The user terminal 103 includes a user agent 313 and a message reception unit 314. The user agent 313 is, for example, a web browser, and provides a function that allows the user to access a web site. The user can transmit the service processing execution request to the service providing server 102 via the user agent 313. The message reception unit 314 receives a confirmation message such as an e-mail from the user management server 101. The user's access to a link included in the received confirmation message activates the user agent 313, and transmits the service processing execution request to the service providing server 102.

<Processing in Information Processing System>

Subsequently, the flow of processing performed by the information processing system according to the present exemplary embodiment will be described with reference to FIG. 5. In the descriptions below, each step (process) is denoted by prefixing the reference number with "S".

In step S501, the user agent 313 transmits a service processing execution request A to the service providing server 102. In step S502, the service processing request reception unit 307 receives the service processing execution request A from the user terminal 103. In step S503, the user processing request transmission unit 308 transmits a user processing execution request A to the user management server 101. The user processing execution request A includes information indicating at least a content of user processing, a target user, and a client that is a requestor of the user processing, i.e., the service providing server 102.

Figure 6A:
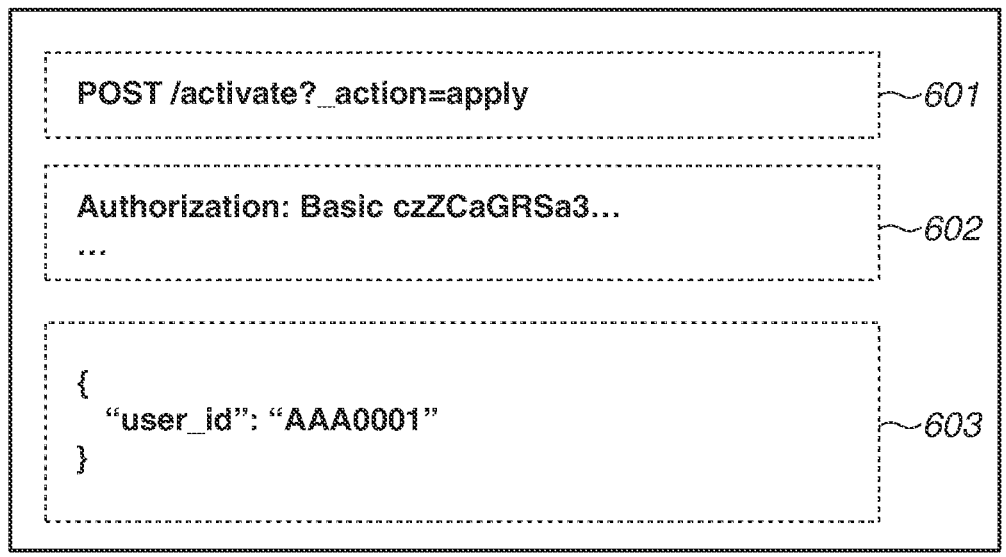
FIGS. 6A and 6B are diagrams each illustrating an example of a message of a user processing execution request.

FIG. 6A illustrates an example of the user processing execution request A. In FIG. 6A, a message is composed using a syntax in conformity with Hypertext Transfer Protocol (HTTP). In a uniform resource locator (URL) section 601, the content of the user processing is designated. In a header section 602, authentication information of the client that is the requestor of the user processing is designated. In a body section 603, user ID is designated as information indicating the user to be a target of the user processing.

In step S504, the user processing request reception unit 302 receives the user processing execution request A from the service providing server 102. In step S505, the verification unit 303 executes processing of verifying the received user processing execution request A. The processing of verifying the user processing execution request A will be described below with reference to FIG. 9. In step S506, in a case where the verification unit 303 determines that the user processing execution request is valid, the message transmission unit 304 transmits, to the user terminal 103, a confirmation message for executing the user processing after user authentication. The confirmation message includes a link for transmitting a service processing execution request B to the service providing server 102. A confirmation code issued to execute the user processing is added to the link. The issued confirmation code is stored in the confirmation code information storage unit 3013. FIG. 7 illustrates an example of the confirmation message. A link 701 for transmitting the service processing execution request B to the service providing server 102 is included as a URL in the confirmation message. The confirmation code to execute the user processing in the user management server 101 is added to the link 701 as a URL parameter. While an e-mail is used to transmit the confirmation message in the present exemplary embodiment, another notification means may be used.

Figure 8:
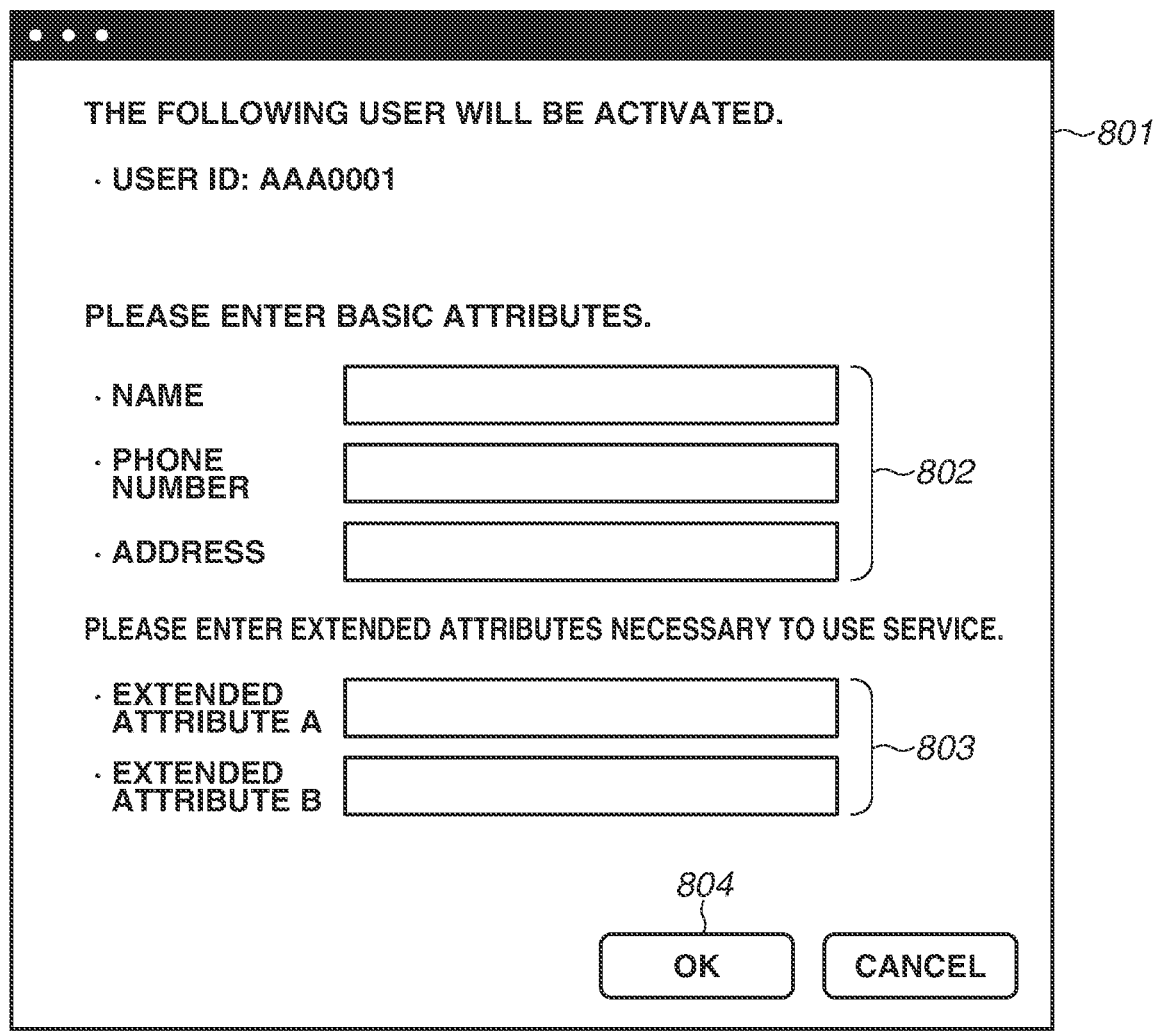
FIG. 8 is a diagram illustrating an example of an integrated service screen.

In step S507, the message reception unit 314 receives the confirmation message from the user management server 101. In step S508, in response to the user's access to the link included in the confirmation message, the user agent 313 transmits the service processing execution request B to the service providing server 102. In step S509, the service processing request reception unit 307 receives the service processing execution request B from the user terminal 103. In step S510, the screen providing unit 309 displays the integrated service screen on the user terminal 103 and accepts a parameter input to the user terminal 103. FIG. 8 illustrates an example of the integrated service screen to be displayed. An integrated service screen 801 includes a region 802 in which parameters necessary for the user processing of the user management server 101 are input, and a region 803 in which a parameter necessary for the service processing of the service providing server 102 is input. The integrated service screen 801 also includes a button 804 to confirm the input parameter and transmit the confirmed parameter to the service providing server 102.

Figure 6B:
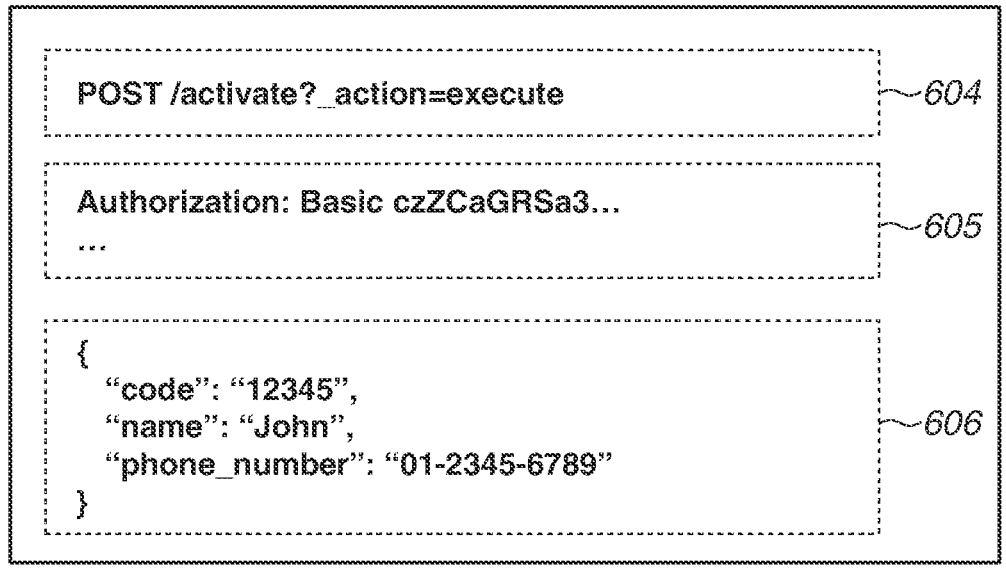

In step S511, the user processing request transmission unit 308 transmits a user processing execution request B to the user management server 101. The user processing execution request B includes information indicating at least the content and parameter of the user processing and the client that is the requestor of the user processing, i.e., the service providing server 102, and information indicating the confirmation code. FIG. 6B illustrates an example of the user processing execution request B. In FIG. 6B, a message is composed using a syntax in conformity with the HTTP. In a URL section 604, the content of the user processing is designated. In a header section 605, authentication information about the client that is the requestor of the user processing is designated. In a body section 606, the confirmation code and parameter necessary for the user processing are designated.

In step S512, the user processing request reception unit 302 receives the user processing execution request B from the service providing server 102. In step S513, the verification unit 303 executes processing of verifying the received user processing execution request B. The processing of verifying the user processing execution request B will be described below with reference to FIG. 10. In step S514, in a case where the verification unit 303 determines that the user processing execution request B is valid, the user processing execution unit 305 executes the user processing. The user processing executed herein includes, for example, initial activation and updating of a password and an e-mail address. In step S515, the user processing result transmission unit 306 transmits a result of the user processing to the service providing server 102. In step S516, the user processing result reception unit 310 receives the result of the user processing from the user management server 101. In step S517, the service processing execution unit 311 executes the service processing on the basis of the result of the user processing. In step S518, the service processing result transmission unit 312 transmits a result of the service processing to the user terminal 103. In step S519, the user agent 313 receives the result of the service processing from the service providing server 102.

<Processing of Verifying User Processing Execution Request A (S505)>

Figure 9:
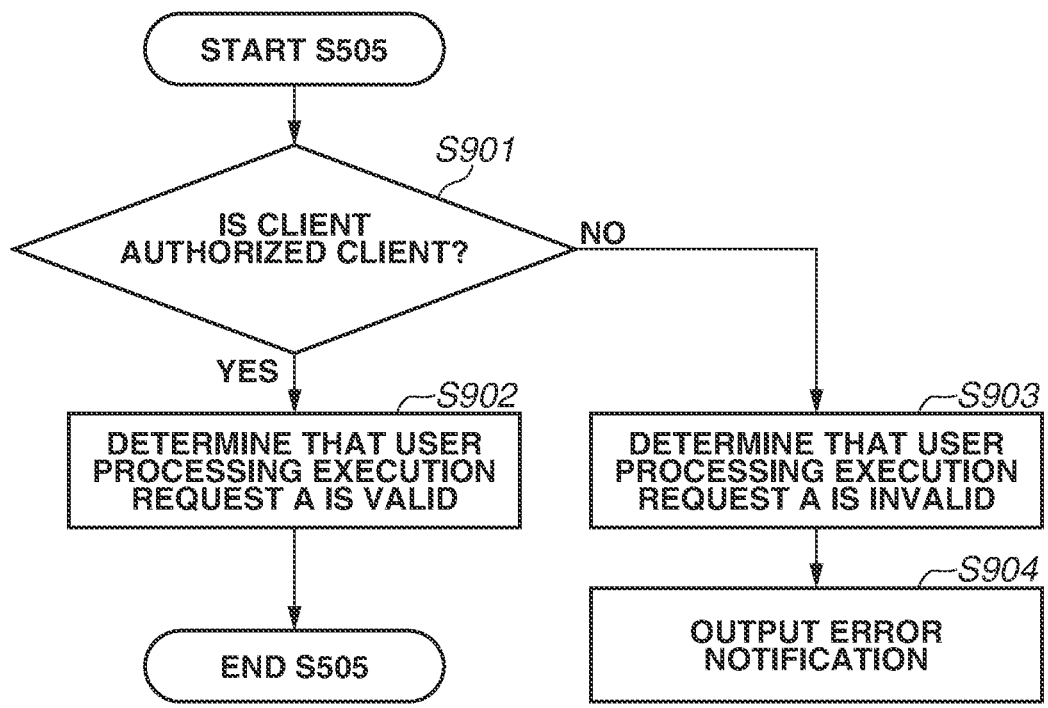
FIG. 9 is a flowchart illustrating processing of verifying a user processing execution request A.

Subsequently, the processing of verifying the user processing execution request A executed in step S505 will be described with reference to FIG. 9. In step S901, the verification unit 303 verifies whether the client designated by the user processing execution request A is an authorized client. If the client ID 404 and the client secret 405 stored in the client information storage unit 3012 match those designated by the user processing execution request A (YES in step S901), the verification unit 303 determines that the client is the authorized client, and the processing proceeds to step S902. If the client ID 404 and the client secret 405 stored in the client information storage unit 3012 do not match those designated by the user processing execution request A (NO in step S901), the verification unit 303 determines that the client is an unauthorized client, and the processing proceeds to step S903. In step S902, in response to determination that the client is the authorized client, the verification unit 303 determines that the user processing execution request A is valid, and the processing proceeds to step S506. In step S903, in response to the determination that the client is the unauthorized client, the verification unit 303 determines that the user processing execution request A is invalid, and the processing proceeds to step S904. In step S904, the verification unit 303 outputs information indicating that the user processing execution request A is invalid (error notification) to the service providing server 102 or the user terminal 103, and the processing ends.

<Processing of Verifying User Processing Execution Request B (S513)>

Figure 10:
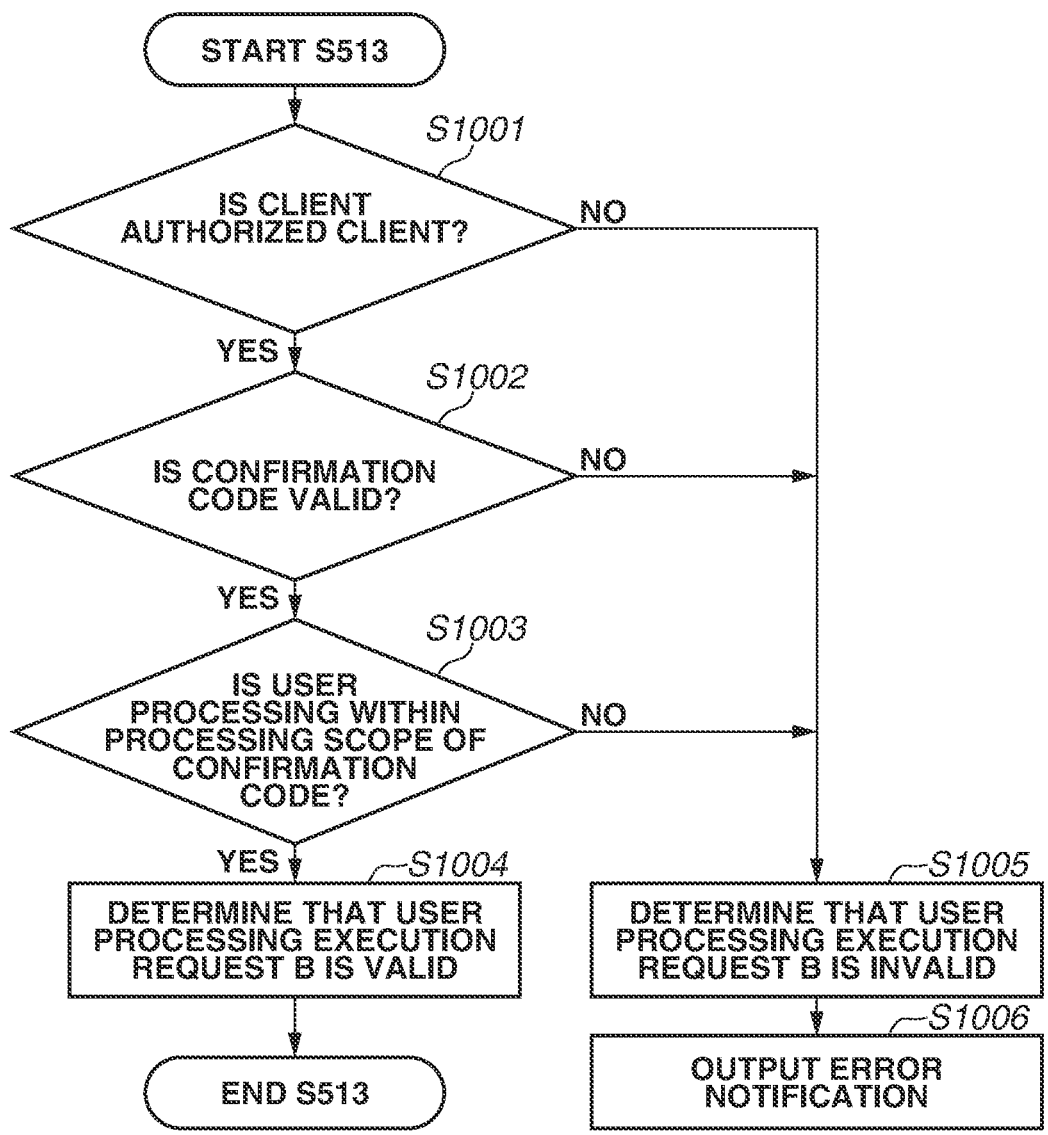
FIG. 10 is a flowchart illustrating processing of verifying a user processing execution request B.

Subsequently, the processing of verifying the user processing execution request B executed in step S513 will be described with reference to FIG. 10. In step S1001, the verification unit 303 verifies whether the client designated by the user processing execution request B is the authorized client. If the client ID 404 and the client secret 405 stored in the client information storage unit 3012 match with those designated by the user processing execution request B (YES in step S1001), the verification unit 303 determines that the client is the authorized client, and the processing proceeds to step S1002. If the client ID 404 and the client secret 405 stored in the client information storage unit 3012 do not match with those designated by the user processing execution request B (NO in step S1001), the verification unit 303 determines that the client is the unauthorized client, and the processing proceeds to step S1005.

In step S1002, the verification unit 303 verifies whether the confirmation code designated by the user processing execution request B is valid. If the confirmation code is before the expiration date 414 stored in the confirmation code information storage unit 3013 and the client ID 411 matches the client verified in step S1001 (YES in step S1002), the verification unit 303 determines that the confirmation code is valid, and the processing proceeds to step S1003. If the confirmation code is not before the expiration date 414 stored in the confirmation code information storage unit 3013 or the client ID 411 does not match the client verified in step S1001 (NO in step S1002), the verification unit 303 determines that the confirmation code is invalid, and the processing proceeds to step S1005.

In step S1003, the verification unit 303 verifies whether the user processing designated by the user processing execution request B is within a processing scope of the confirmation code. In step S1004, in response to determination that the user processing is within the processing scope (YES in step S1003), the verification unit 303 determines that the user processing execution request B is valid, and the processing proceeds to step S514. In step S1005, in response to determination that the user processing is not within the processing scope (NO in step S1003), the verification unit 303 determines that the user processing execution request B is invalid, and the processing proceeds to step S1006. In step S1006, the verification unit 303 outputs information indicating that the user processing execution request B is invalid (error notification) to the service providing server 102 or the user terminal 103, and the processing ends.

<Effect of First Exemplary Embodiment>

As described above, the information processing apparatus according to the present exemplary embodiment receives the user processing execution request involving user authentication from the server that provides a service to a user. The information processing apparatus verifies whether the execution request is valid, and on the basis of a result of the verification, transmits the message including the link for accessing the server to the terminal operated by the user. The message is a message to provide the terminal with a screen that allows the server to execute the service processing depending on a result of the user processing. With this configuration, the server can execute the service processing depending on the result of the user processing. Furthermore, this configuration can save the user's trouble of checking screens in comparison with a case where the user processing and the service processing are executed independently of each other.

In the first exemplary embodiment, the user management server 101 executes the processing of verifying the user processing execution request on the basis of whether the client is the authorized client. In a second exemplary embodiment, the user management server 101 further executes the processing of verifying the user processing execution request on the basis of authority of the client. A configuration of an information processing system according to the second exemplary embodiment is similar to that according to the first exemplary embodiment, and thus a description thereof is omitted. The following descriptions will be mainly given of part of the second exemplary embodiment different from the first exemplary embodiment. The same constituent element is denoted by the same reference sign in the following descriptions.

<Processing of Verifying User Processing Execution Request A (S505)>

Figure 11:
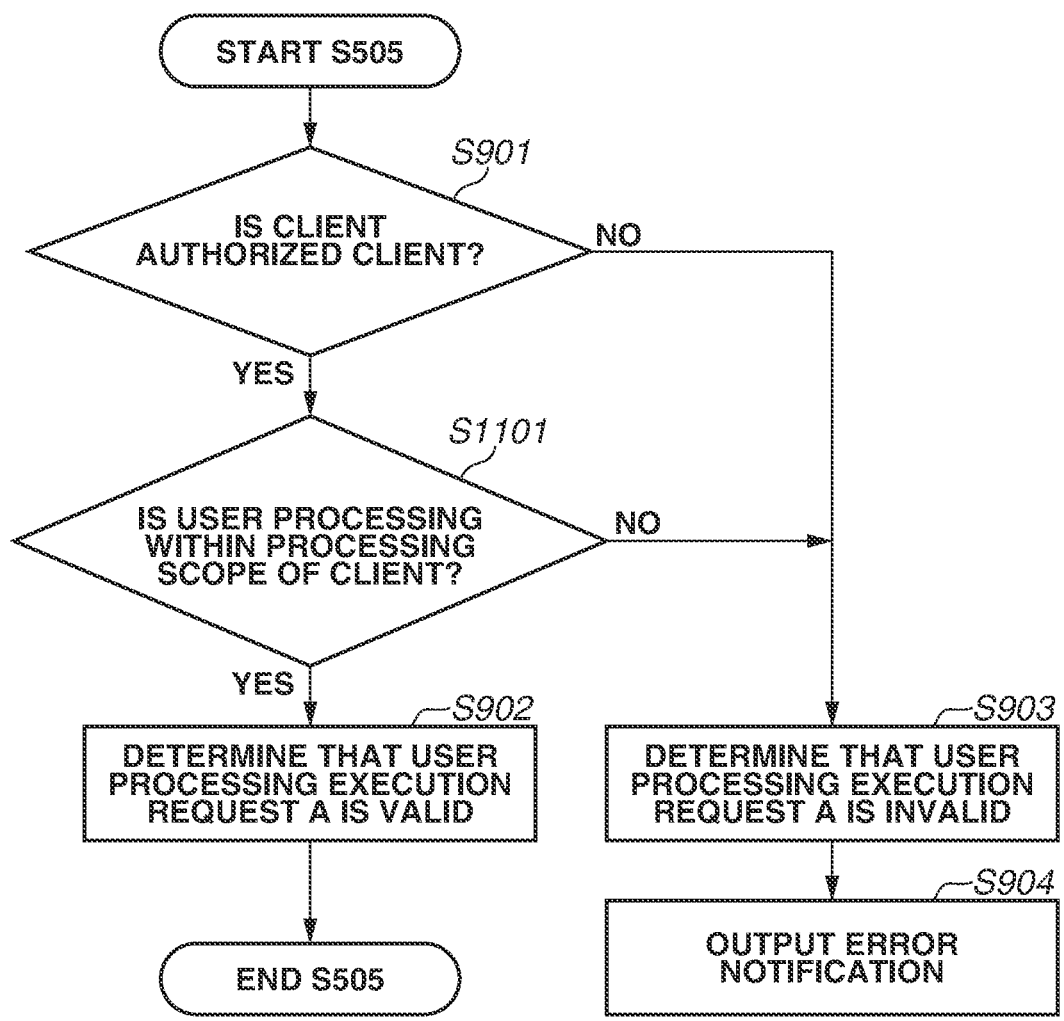
FIG. 11 is a flowchart illustrating processing of verifying the user processing execution request A.

The processing of verifying the user processing execution request A executed in step S505 will be described with reference to FIG. 11. In step S901, the verification unit 303 verifies whether the client designated by the user processing execution request A is an authorized client. If the verification unit 303 determines that the client is the authorized client, the processing proceeds to step S1101. If the verification unit 303 determines that the client is an unauthorized client, the processing proceeds to step S903.

In step S1101, the verification unit 303 verifies whether the content of the user processing designated by the user processing execution request A is within a processing scope of the client. If the processing scope 407 stored in the client information storage unit 3012 matches a processing scope designated by the user processing execution request A (YES in step S1011), the verification unit 303 determines that the content of the user processing is within the processing scope, and the processing proceeds to step S902. If the processing scope 407 stored in the client information storage unit 3012 does not match the processing scope designated by the user processing execution request A (NO in step S1011), the verification unit 303 determines that the content of the user processing is not within the processing scope, and the processing proceeds to step S903. In step S902, the verification unit 303 determines that the user processing execution request A is valid, and the processing proceeds to step S506. In step S903, the verification unit 303 determines that the user processing execution request A is invalid, and the processing proceeds to step S904. In step S904, the verification unit 303 outputs information indicating that the user processing execution request A is invalid (error notification) to the service providing server 102 or the user terminal 103, and the processing ends.

<Effect of Second Exemplary Embodiment>

As described above, the information processing apparatus according to the present exemplary embodiment executes the processing of verifying the user processing execution request on the basis of the authority of the client. This enables minute control of the content of the permitted user processing based on a role of the service providing server.

<Modification>

While in the present exemplary embodiment, whether the content of the user processing is within the processing scope is determined on the basis of whether the processing scope 407 stored in the client information storage unit 3012 matches a processing scope designated by the user processing execution request A, another determination method may be employed. For example, a method may be employed in which mapping information defining a relationship between the content of the processing designated by the user processing execution request A and the processing scope 407 stored in the client information storage unit 3012 is separately held, and determination is made on the basis of the mapping information.

The description has been given of the first exemplary embodiment using the example of executing the service processing of the service providing server 102 depending on a result of the user processing of the user management server 101. In a third exemplary embodiment, a description will be given of an example of executing processing of an application that operates on the user terminal 103 depending on a result of the user processing of the user management server 101. The following descriptions will be mainly given of part of the third exemplary embodiment different from the first exemplary embodiment. The same constituent element is denoted by the same reference sign in the following descriptions.

<Functional Configuration of Information Processing System>

Figure 12:
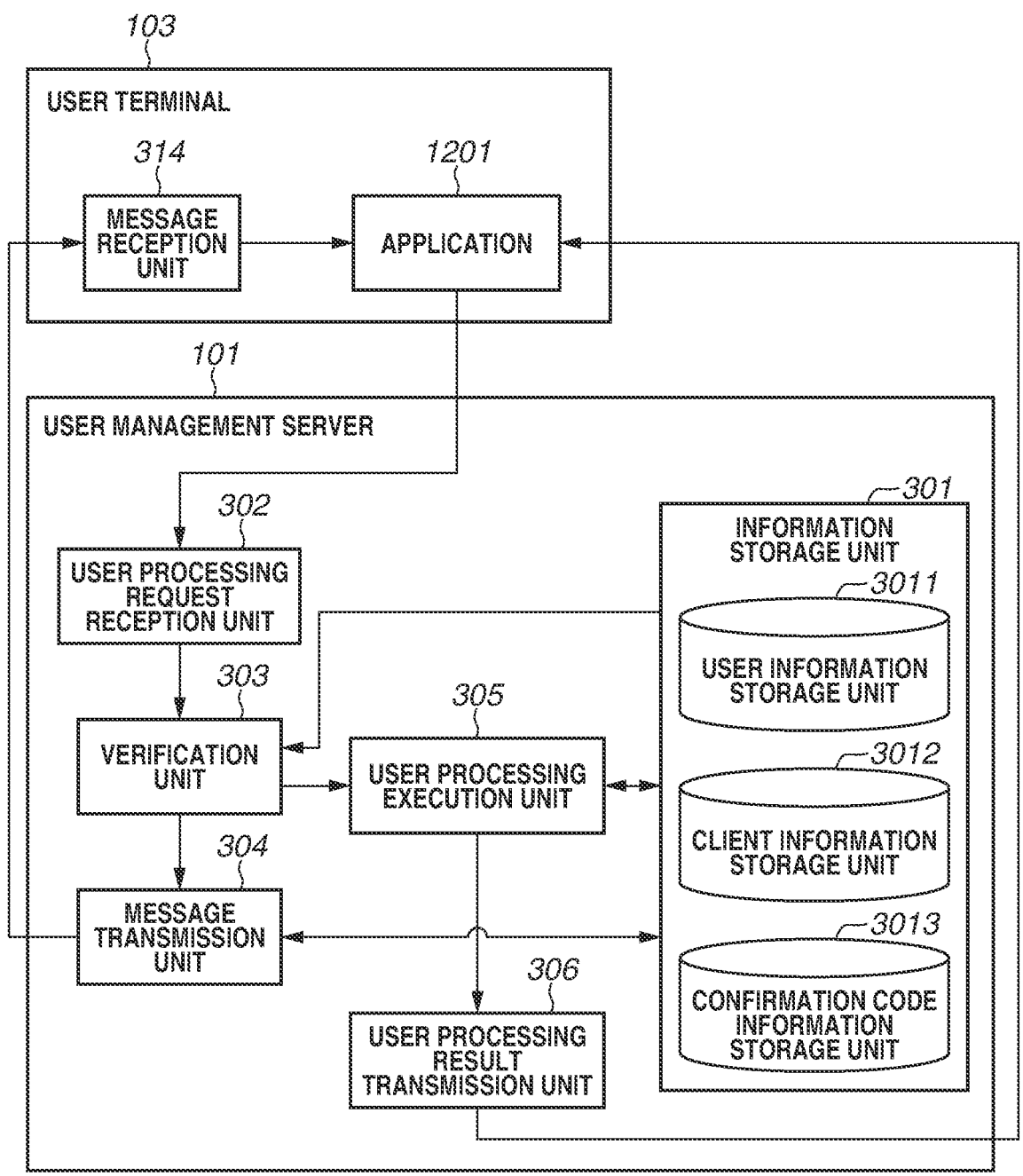
FIG. 12 is a block diagram illustrating a functional configuration example of an information processing system.

A functional configuration example of an information processing system according to the present exemplary embodiment will be described with reference to a block diagram illustrated in FIG. 12. The user management server 101 has a functional configuration similar to that of the first exemplary embodiment. The user terminal 103 includes an application 1201 and the message reception unit 314. When the application 1201 executes application processing in response to a user's instruction, the user terminal 103 transmits the user processing execution request A to the user management server 101. The user processing request reception unit 302 of the user management server 101 receives the user processing execution request A, and the message transmission unit 304 transmits a confirmation message to the user terminal 103. The message reception unit 314 of the user terminal 103 receives the confirmation message. The user's access to a link included in the confirmation message activates the application 1201 and transmits the user processing execution request B to the user management server 101. The user processing request reception unit 302 of the user management server 101 receives the user processing execution request B, and the user processing execution unit 305 executes the user processing.

<Effect of Third Exemplary Embodiment>

As described above, the information processing apparatus according to the present exemplary embodiment transmits the confirmation message to execute the application processing to the user terminal. The application on the user terminal calls the user processing together with the confirmation code indicating that the personal identification has been verified. This enables execution of the user processing involving personal identification verified in the user management server via the application on the user terminal.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-014217, filed Jan. 30, 2020, which is hereby incorporated by reference herein in its entirety.

What is claimed is:

1. An information processing apparatus configured to manage information regarding a user, the information processing apparatus comprising:
one or more processors; and
at least one memory storing executable instructions, which when executed by the one or more processors, cause the information processing apparatus to:
receive an execution request for executing first processing involving authentication of the user from a server configured to provide a service to the user;
verify whether the execution request is valid; and
transmit, to a terminal operated by the user, a message including a link for accessing the server on a basis of a result of the verification,
wherein the message is a message to provide the terminal with an integrated screen, the integrated screen provided on the terminal by the server based on the user accessing the link, the integrated screen comprising a first input region for inputting information to be used in the first processing and a second input region for inputting information to be used in providing the service.

2. The information processing apparatus according to claim 1 wherein the instructions, when executed by the one or more processors, cause the information processing apparatus to determine whether the execution request is valid on the basis of whether the server is an authorized client.

3. The information processing apparatus according to claim 2, wherein the instructions, when executed by the one or more processors, cause the information processing apparatus to determine whether the execution request is valid on the basis of whether information about a client designated by the execution request matches information about the client held in advance.

4. The information processing apparatus according to claim 1, wherein the message includes a code to determine whether the first processing is to be executed, and
wherein the instructions, when executed by the one or more processors, cause the information processing apparatus to:
verify whether the code has passed an expiration date; and
execute the first processing on the basis of the result of the verification regarding the expiration date.

5. The information processing apparatus according to claim 4, wherein the instructions, when executed by the one or more processors, cause the information processing apparatus to execute the first processing in a case where a content of the first processing is included in a processing scope designated by the code.

6. The information processing apparatus according to claim 4, wherein the instructions, when executed by the one or more processors, further cause the information processing apparatus to transmit a result of the executed first processing to the server,
wherein second processing is executed on the basis of the result of the executed first processing.

7. The information processing apparatus according to claim 4, wherein the code is a one-time password.

8. The information processing apparatus according to claim 1, wherein the instructions, when executed by the one or more processors, cause the information processing apparatus to transmit the message by e-mail.

9. The information processing apparatus according to claim 1, wherein the first processing is at least one of registration, updating, and deletion of information regarding the user.

10. An information processing system configured to execute processing involving authentication of a user, the information processing system comprising:
a first server configured to provide a service to the user, the first server including first one or more processors; and
a second server configured to manage information regarding the user, the second server including second one or more processors, wherein the first server is configured to transmit an execution request for executing the processing to the second server, wherein the second server is configured to:
verify whether the first server is an authorized client; and
transmit, to a terminal operated by the user, a message including a link for accessing the first server on a basis of a result of the verification, and wherein the first server is configured to provide the terminal with an integrated screen, the integrated screen provided on the terminal by the first server based on the user accessing the link, the integrated screen comprising a first input region for inputting information to be used in the processing and a second input region for inputting information to be used in providing the service.

11. An information processing apparatus configured to manage information regarding a user, the information processing apparatus comprising:
one or more processors; and
at least one memory storing executable instructions, which when executed by the one or more processors, cause the information processing apparatus to:
receive an execution request for executing first processing involving authentication of the user from a terminal operated by the user for accessing a service provided by an application of the terminal;
verify whether the execution request is valid; and
transmit, to the terminal, a message including a link for accessing the application of the terminal on a basis of a result of the verification,
wherein the message is a message to provide the terminal with an integrated screen, the integrated screen provided on the terminal by the application based on the user accessing the link, the integrated screen comprising a first input region for inputting information to be used in the first processing and a second input region for inputting information to be used in providing the service.

12. A non-transitory storage medium storing a program causing a computer to execute an information processing method, the information processing method comprising:
receiving an execution request for executing first processing involving authentication of a user from a server configured to provide a service to the user;
verifying whether the execution request is valid; and
transmitting, to a terminal operated by the user, a message including a link for accessing the server on a basis of a result of the verification,
wherein the message is a message to provide the terminal with an integrated screen, the integrated screen provided on the terminal by the server based on the user accessing the link, the integrated screen comprising a first input region for inputting information to be used in the first processing and a second input region for inputting information to be used in providing the service.

13. An information processing method to manage information regarding a user, the information processing method comprising:
receiving an execution request for executing first processing involving authentication of the user from a server configured to provide a service to the user;
verifying whether the execution request is valid; and
transmitting, to a terminal operated by the user, a message including a link for accessing the server on a basis of a result of the verification,
wherein the message is a message to provide the terminal with an integrated screen, the integrated screen provided on the terminal by the server based on the user accessing the link, the integrated screen comprising a first input region for inputting information to be used in the first processing and a second input region for inputting information to be used in providing the service.

14. An information processing method to execute processing involving authentication of a user via a first server configured to provide a service to the user and a second server configured to manage information regarding the user, the information processing method comprising:
transmitting an execution request for executing the processing from the first server to the second server;
verifying, in the second server, whether the first server is an authorized client;
transmitting, to a terminal operated by the user, a message including a link for accessing the first server on a basis of a result of the verification; and
providing the terminal with an integrated screen, the integrated screen provided on the terminal by the first server based on the user accessing the link, the integrated screen comprising a first input region for inputting information to be used in the processing and a second input region for inputting information to be used in providing the service.

15. An information processing method to manage information regarding a user, the information processing method comprising:
receiving an execution request for executing first processing involving authentication of the user from a terminal operated by the user for accessing a service provided by an application of the terminal;
verifying whether the execution request is valid; and
transmitting, to the terminal, a message including a link for accessing the application of the terminal on a basis of a result of the verification,
wherein the message is a message to provide the terminal with an integrated screen, the integrated screen provided on the terminal by the application based on the user accessing the link, the integrated screen comprising a first input region for inputting information to be used in the first processing and a second input region for inputting information to be used in providing the service.

* * * * *